(12) United States Patent
Kang

(10) Patent No.: US 6,927,910 B2
(45) Date of Patent: Aug. 9, 2005

(54) INTEGRATOR, POLARIZATION CONVERSION DEVICE, AND DISPLAY APPARATUS USING THE SAME

(75) Inventor: Ho Joong Kang, Enijungbu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/418,223

(22) Filed: Apr. 18, 2003

(65) Prior Publication Data

US 2003/0197834 A1 Oct. 23, 2003

(30) Foreign Application Priority Data

| Apr. 19, 2002 | (KR) | 10-2002-0021560 |
| May 25, 2002 | (KR) | 10-2002-0029099 |
| Jul. 2, 2002 | (KR) | 10-2002-0037989 |
| Aug. 30, 2002 | (KR) | 10-2002-0051929 |

(51) Int. Cl.[7] ............... G02B 5/30; G02B 27/28; G02B 6/00; F21V 9/14; F21V 8/00
(52) U.S. Cl. ............ 359/485; 359/494; 359/894; 385/901; 362/19; 362/551
(58) Field of Search .............. 359/894, 483, 359/485, 486, 487, 494; 362/551, 561, 583, 19; 385/133, 901; 353/20

(56) References Cited

U.S. PATENT DOCUMENTS

| 6,739,723 B1 * | 5/2004 | Haven et al. | 353/20 |
| 6,795,243 B1 * | 9/2004 | McGettigan et al. | 359/486 |
| 6,870,683 B2 * | 3/2005 | Park | 359/634 |
| 2001/0008470 A1 * | 7/2001 | Dewald | 359/850 |
| 2003/0007130 A1 * | 1/2003 | Maximus | 353/20 |
| 2003/0007245 A1 * | 1/2003 | Edlinger et al. | 359/487 |
| 2003/0020839 A1 * | 1/2003 | Dewald | 348/743 |
| 2003/0021098 A1 * | 1/2003 | Chang | 362/19 |
| 2003/0086066 A1 * | 5/2003 | Kato | 353/20 |
| 2005/0002169 A1 * | 1/2005 | Drazic et al. | 362/19 |

OTHER PUBLICATIONS

Markus Duelli, et al., "36.2: Integrator Rod with Polarization Recycling Functionality", SID '02 Digest, pp. 1078–1080. 2002.*

D.S. Dewald, et al., "40.2: Sequential Color Recapture and Dynamic Filtering: A Method of Scrolling Color", SID '01 Digest, pp. 1076–1079. 2001.*

* cited by examiner

Primary Examiner—John Juba, Jr.
(74) Attorney, Agent, or Firm—Fleshner & Kim LLP

(57) ABSTRACT

An integrator and a display apparatus using the same simplify the structure of an optical system and minimize optical loss. The integrator homogenizes, polarizes and recaptures incident lights. The optical loss can be reduced by using a color drum and a color wheel engaged with the integrator. In order to minimize the optical loss, a polarization conversion device where a color bar filter or color switch is directly adhered to an integrator is used. The polarization conversion device can be applied to a projector for embodying small images into large ones.

8 Claims, 22 Drawing Sheets

Phase of input light

Phase of light passing through first R wave plate

Phase of light passing through liquid crystal cell (no phase modulation)

Phase of light passing through second R wave plate

Phase of light passing through liquid crystal cell (phase modulation)

Phase of light passing through second R wave plate

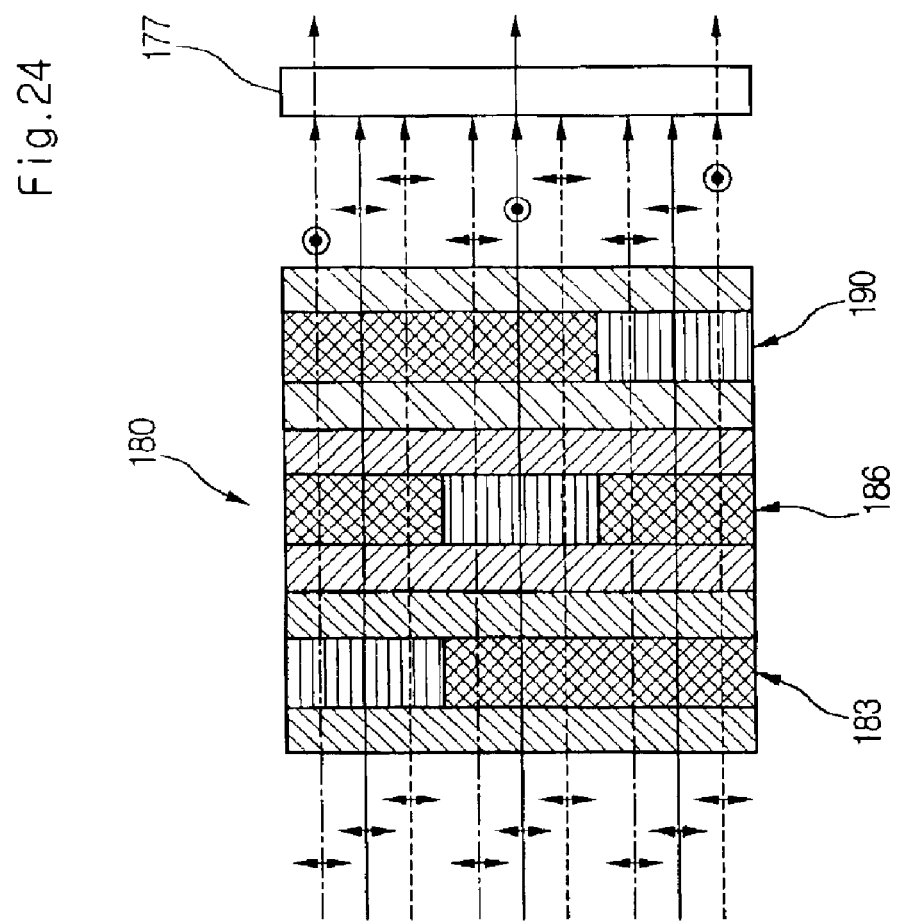

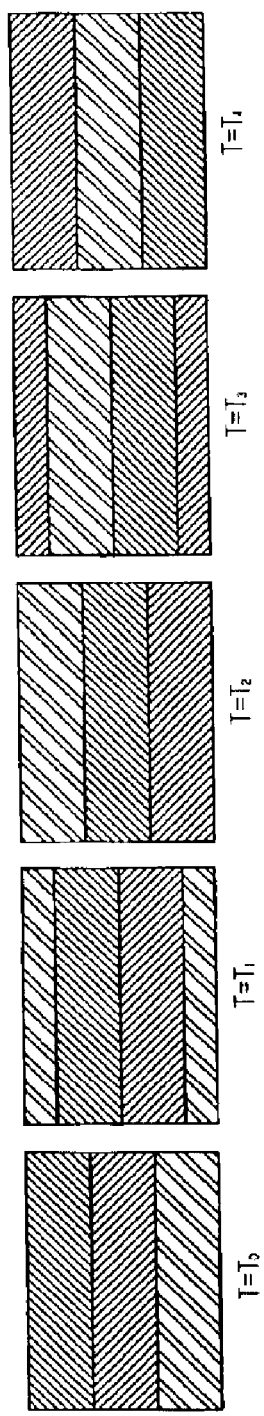

INTEGRATOR, POLARIZATION CONVERSION DEVICE, AND DISPLAY APPARATUS USING THE SAME

BACKGROUND OF THE INVENTION

1. Field of the Invention

The present invention relates to a display apparatus for displaying large-screen images, and more particularly to an integrator which can improve optical efficiency by simplifying the structure of an optical system and minimizing optical loss, and a polarization conversion device using the same.

2. Background of the Related Art

Recently, a plate-type display apparatus which is thin and suitable for large-screen images has attracted attention instead of a CRT (Cathode Ray Tube) which is restricted in screen size and which has a large-sized system. Exemplary plate-type display apparatuses include LCD (Liquid Crystal Display, PDP (Plasma Display Panel) and projector.

Among the large-screen image display apparatuses, the projector displays color images by enlarging and projecting small images of a small-sized display device into a large screen through a projecting lens. It has been expected to replace the other large-screen image displays apparatuses.

In general, the projector includes a lamp system for generating lights, an optical system for condensing the lights, a display device for displaying the condensed lights after modulating the optical property thereof according to an electric signal, and a projection optical system for enlarging and projecting the modulated colors. Here, the display device is classified into a transmission type for transmitting the incident lights and a reflection type for reflecting the incident lights according to the electric signal. In addition, a transmission or reflection type LCD which is advantageous in miniaturization is generally used as the display device.

The projector is divided into a single-plate type using one display device, a two-plate type using two display devices, and a three-plate type using three display devices.

For example, the three-plate type display device is used for high luminance, and the single-plate type display device is used for miniaturization and light weight.

FIG. 1 is a view illustrating an optical system for a conventional projector.

Referring to FIG. 1, the optical system includes a lamp system 1 for generating lights, and a polarization conversion system 5 for polarizing and outputting the lights from the lamp system 1.

The lamp system 1 has a bulb 2 for generating lights, and a reflecting mirror 3 for outputting the lights from the bulb 2 in parallel.

The polarization conversion system 5 is composed of a first optical device 7, a second optical device 10 and a second illuminating lens 16.

In the first optical device 7, a plurality of luminous flux splitting lens 8 formed in a rectangular shape are aligned in a matrix form. Preferably, the first optical device 7 is a fly eye lens.

The second optical device 10 which is a polarization conversion device includes a fly eye lens 11, a polarization splitting unit array 13, a wave plate 14 and a first illuminating lens 15.

Here, the lights generated in the lamp system 1 are inputted to the second optical device 10 via the first optical device 7. The lights inputted to the second optical device 10 are spatially split into P polarized lights and S polarized lights by the polarization splitting unit array 13, and incorporated by the wave plate 14.

The incorporated polarized lights are irradiated to the second illuminating lens 16 via the first illuminating lens 15.

FIG. 2 is a view illustrating a projection system using a general three-plate transmission type LCD for the conventional projector.

As illustrated in FIG. 2, the projection system includes a second illuminating lens 16 for condensing the lights from the bulb to a panel, R, G and B reflecting mirrors 17, 18 and 19 for splitting the lights from the second illuminating lens 16 into color lights, reflecting mirrors 20 and 21 for re-reflecting the lights from the R, G and B reflecting mirrors 17, 18 and 19, R, G and B LCDs 22, 23 and 24 for modulating the lights from the reflecting mirrors 20 and 21 to add image information to each color light, a PBS (Polarizing Beam Splitter) 25 for forming color images by synthesizing the modulated lights from the R, G and B LCDs 22, 23 and 24, and a projecting lens 26 for enlarging and projecting the color images from the PBS 25 into a screen 27.

In the projection system, the lights from the second illuminating lens 16 are inputted to the R reflecting mirror 17. The B and G lights are transmitted through the R reflecting mirror 17, and the R lights are reflected by the R reflecting mirror 17. The R lights reflected by the R reflecting mirror 17 are re-reflected by the reflecting mirror 20, and inputted to the R LCD 22.

On the other hand, the B lights transmitted through the R reflecting mirror 17 are transmitted through the G reflecting mirror 18, and the G lights transmitted through the R reflecting mirror 17 are reflected by the G reflecting mirror 18.

The G lights reflected by the G reflecting mirror 18 are inputted directly to the G LCD 23.

In addition, the B lights transmitted through the G reflecting mirror 18 are reflected by the B reflecting mirror 19 and the reflecting mirror 21, and inputted to the B LCD 24.

Here, the R, G and B LCDs 22,23 and 24 modulate the inputted color lights to add image information to each color light, and transmit them to the PBS 25.

The PBS 25 receives the modulated lights from the R, G and B reflecting mirrors 22, 23 and 24, synthesizes them to form color images, and transmits the color images to the projecting lens 26.

The projecting lens 26 enlarges and projects the color images into the screen 27 to form projection images.

However, the three-plate type LCD has three problems as follows:

Firstly, a number of optical components increases. Especially, a relay system for compensating for optical path difference is used in addition to the illumination system. A size of the optical system also increases.

Secondly, red color purity decreases due to deficiency of R lights outputted from the lamp system. Therefore, a capability of displaying colors, namely color gamut decreases.

Third, additional expenses incur due to an increased number of LCDs which are major components of the optical system. It also causes alignment problems between the optical components.

In order to solve the foregoing problems, there has been suggested a single or two-plate type optical system as shown in FIG. 3.

FIG. 3 is a schematic view illustrating a conventional single-plate type projector.

The single-plate type projector has the similar structure as the three-plate type projector of FIGS. 1 and 2. That is, the single-plate type projector includes a lamp system, first and second optical devices, an illuminating lens, a PBS and a projecting lens like the three-plate type projector. However, differently from the three-plate type projector for spatially splitting color lights, the single-plate type projector uses a color scroll device for temporally splitting color lights such as a color drum and a color wheel. In addition, the three-plate type projector uses three LCDs, but the single-plate type projector uses only one LCD.

As depicted in FIG. 3, the single-plate type projector includes a lamp system 1 for generating lights, a first optical device 7 for homogenizing the lights from the lamp system 1, a second optical device 10 for converting a polarization property of the lights from the first optical device 7, a color wheel 28 for splitting the lights from the second optical device 10 into R, G and B lights, and scrolling them, and an optical modulation system 30 for selectively modulating the R, G and B lights according to an image signal to spatially embody color images. Here, a polarization conversion device can be used as the second optical device, which was explained above with reference to FIG. 1.

The color wheel 28 splits the polarized S-wave lights from the second optical device 10 into R, G and B lights. As shown in FIG. 4, the color wheel 28 is generally formed in a disk shape where R, G and B transmitting filters 31, 32 and 33 are sequentially aligned. While the color wheel 28 is rotated, the incident lights are selectively transmitted through the R, G and B transmitting filters 31, 32 and 33.

Accordingly, in the single-plate type projector, the lights generated in the lamp system 1 are homogenized by the first optical device 7, and polarized by the second optical device 10.

The polarized lights are split into R, G and B lights by the color wheel 28, selectively transmitted, and inputted to the optical modulation system 30.

The R, G and B lights passing through an illuminating lens 16 of the optical modulation system 30 are modulated according to the image information from an LCD 29, synthesized by a PBS 25 to form color images, and enlarged and projected into a screen through a projecting lens 26.

However, the single-plate type projector uses high-priced optical components such as the first and second optical devices for homogenizing the lights from the lamp system and polarizing the homogenized lights, which increases the production cost. In addition, it is difficult to align the plurality of optical components. A size of the optical system also increases.

Especially, the scroll device mostly used for the single or two-plate type projector, such as a color wheel or color drum transmits one of the R, G and B lights from the polarization conversion device, and reflects the other lights, thereby separately scrolling the R, G and B lights.

However, the lights reflected by the color wheel or color drum are wasted, which reduces optical efficiency. That is, the conventional scroll device does not have a means for recapturing and recycling the reflected lights.

As illustrated in FIG. 4, in the case of the color wheel having the R, G and B transmitting filters 31, 32 and 33, approximately ⅔ of incident lights are lost during the color splitting and scrolling processes.

SUMMARY OF THE INVENTION

An object of the invention is to solve at least the above problems and/or disadvantages and to provide at least the advantages described hereinafter.

Accordingly, one object of the present invention is to solve the foregoing problems by providing an integrator which can perform polarization conversion and color recapturing in a single or two-plate type projector.

Another object of the present invention is to provide a display apparatus which can minimize optical loss and improve optical efficiency by using a polarization conversion device having an integrator.

Another object of the invention is to perform color recapturing in a transmission type LCD and a reflection type LCD which use polarization as well as a DLP which does not use polarization, by maintaining one polarization direction of polarized lights during polarization conversion and color recapturing.

Another object of the invention is to increase an amount of lights in a single or two-plate type optical system and improve color purity by using the increased amount of lights, by employing a display device using polarization such as a reflection type LCD and a transmission type LCD.

Another object of the invention is to minimize optical loss generated when R, G and B lights are scrolled after polarization conversion and color recapturing.

Another object of the invention is to provide a small-sized optical system by embodying a simple structure.

Another object of the invention is to provide a low-priced optical system by simplifying the structure of a polarization conversion device.

The foregoing and other objects and advantages are realized by providing an integrator including: an incident unit where an opening which externally-inputted lights pass through is formed, and where a reflecting surface and a phase modulation device are laminated in the area where the opening has not been formed; a polarizing unit for externally outputting polarized lights among the lights inputted to the incident unit; and a recycling unit for recycling the lights inputted to the incident unit within a certain area until they are externally outputted.

The polarizing unit includes: a first polarizing plate positioned separately from the incident unit, for vertically polarizing the lights inputted through the incident unit; and a second polarizing plate positioned at one side of the recycling unit, for transmitting the polarized lights from the first polarizing plate. Here, the first polarizing plate has an inside angle of 45° to the second polarizing plate, and the two polarizing plates have opposite transmission properties.

The recycling unit is formed in a hollow type, solid type or mirrored glass rod.

According to another aspect of the invention, a display apparatus includes: a lamp system for generating heterogeneous lights; an integrator for homogenizing the heterogeneous lights from the lamp system by recycling, and polarizing and outputting the homogenized lights; a color drum for splitting the polarized lights from the integrator into R, G and B lights, and selectively transmitting the split color lights; and an optical modulation system for modulating the color lights selectively transmitted from the color drum according to an image signal in order to form color images.

The lights reflected by the color drum are recaptured by the integrator, and constantly recycled by the integrator until transmitted.

According to another aspect of the invention, an integrator includes: an incident unit where an opening which externally-inputted lights pass through is formed, and where a reflecting surface and a phase modulation device are laminated in the area where the opening has not been formed; a polarizing unit positioned to horizontally face the incident unit, for externally outputting polarized lights among the lights inputted to the incident unit; and a recycling unit for recycling the lights inputted to the incident unit within a certain area until they are externally outputted.

In the polarizing unit, bar-shaped polarizers are formed on a wide plate in one direction at predetermined intervals.

According to another aspect of the invention, a polarization conversion device includes: an integrator for homogenizing externally-inputted heterogeneous lights by recycling, and polarizing and outputting the homogenized lights; and a color wheel for splitting the polarized lights from the integrator into R, G and B lights by rotation, and selectively transmitting the split lights, spiral R, G and B color filters being sequentially aligned in the color wheel.

The lights reflected by the color wheel are recaptured by the integrator, and constantly recycled by the integrator until transmitted.

According to another aspect of the invention, a display apparatus includes: a lamp system for generating heterogeneous lights; a polarization conversion device having an integrator for homogenizing the heterogeneous lights from the lamp system by recycling, and polarizing and recapturing the homogenized lights, and a color wheel for splitting the polarized lights from the integrator into R, G and B lights by spiral R, G and B transmitting filters, and selectively transmitting the split lights; and an optical modulation system for modulating the color lights selectively transmitted from the polarization conversion device according to an image signal in order to form color images. The lights reflected by the color wheel are recaptured by the integrator, and constantly recycled by the integrator until transmitted.

The optical modulation system includes one of a transmission type display device and a reflection type display device.

According to another aspect of the invention, a polarization conversion device includes: an integrator for homogenizing externally-inputted heterogeneous lights by recycling, and polarizing and outputting the homogenized lights; a color bar filter incorporated with the integrator, for splitting the polarized lights from the integrator into R, G and B lights, and selectively transmitting the split lights; and a rotating prism rotated for changing an alignment order of the color lights outputted from the color bar filter.

The integrator includes an incident unit, a polarizing unit and a recycling unit.

In the color bar filter, rectangular R, G and B transmitting filters having a different size are sequentially aligned.

Paths of the color lights from the color bar filter are controlled by rotation of the rotating prism.

According to another aspect of the invention, a display apparatus includes: a lamp system for generating heterogeneous lights; a polarization conversion device having an integrator for polarizing and recapturing the lights from the lamp system, a color bar filter incorporated with the integrator, for splitting the polarized lights from the integrator and selectively transmitting the split lights, and a rotating prism rotated for changing an alignment order of the color lights outputted from the color bar filter; and an optical modulation system for modulating the color lights selectively transmitted from the polarization conversion device according to an image signal in order to form color images.

The optical modulation system can have a DLP which does not use polarization. When the DLP is used, the integrator does not have the polarizing plate and the phase modulation device.

According to another aspect of the invention, a polarization conversion device includes: an integrator for homogenizing externally-inputted heterogeneous lights by recycling, and polarizing and outputting the homogenized lights; and a color switch incorporated with the integrator, for splitting the polarized lights from the integrator into R, G and B lights, and scrolling and transmitting the split lights. The color switch includes R, G and B cells for modulating a phase of each color light, and is aligned to vertically receive the polarized lights from the integrator.

The polarizing unit includes first and second polarizing plates adhered to both sides of the color switch, and the first and second polarizing plates have opposite transmission properties.

Each of the cells includes: first and second wave plates for modulating the phase of the corresponding color lights by 45°; and a liquid crystal cell positioned between the first and second wave plates, for oppositely modulating the phase by 90° according to an electric signal.

The liquid crystal cell has a plurality of data electrodes receiving electric signals in a temporal order. Each of the cells selectively transmits the corresponding color lights under the control of the liquid crystal cells.

According to another aspect of the invention, a display apparatus includes: a lamp system for generating heterogeneous lights; a polarization conversion device having an integrator for polarizing and recapturing the lights from the lamp system, and a color switch having its incorporated R, G and B cells adhered to the integrator, for splitting the polarized lights from the integrator and selectively transmitting the corresponding color lights according to an electric signal; and an optical modulation system for modulating the color lights selectively transmitted from the polarization conversion device according to an image signal in order to form color images.

Each of the cells is aligned to vertically receive the polarized lights from the integrator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 24 is a view illustrating selective transmission of color lights through the color switch in the polarization conversion device of FIG. 20;

FIG. 26 is a view illustrating movements of color bars for each color light displayed on a display device by the color switch in the polarization conversion device of FIG. 20.

DETAILED DESCRIPTION OF PREFERRED EMBODIMENTS

Figure 1:
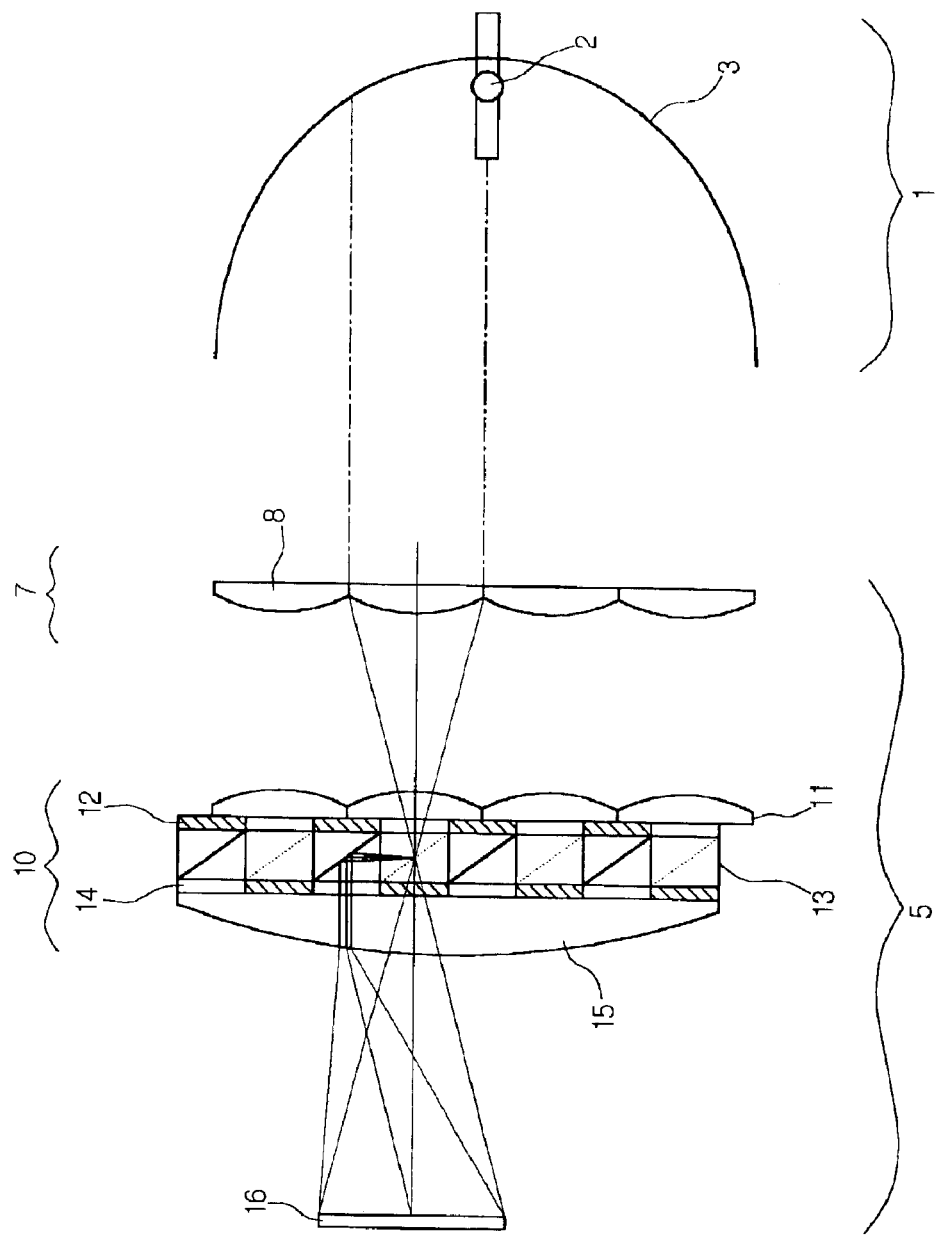
FIG. 1 is a view illustrating an optical system for a conventional projector.
Figure 2:
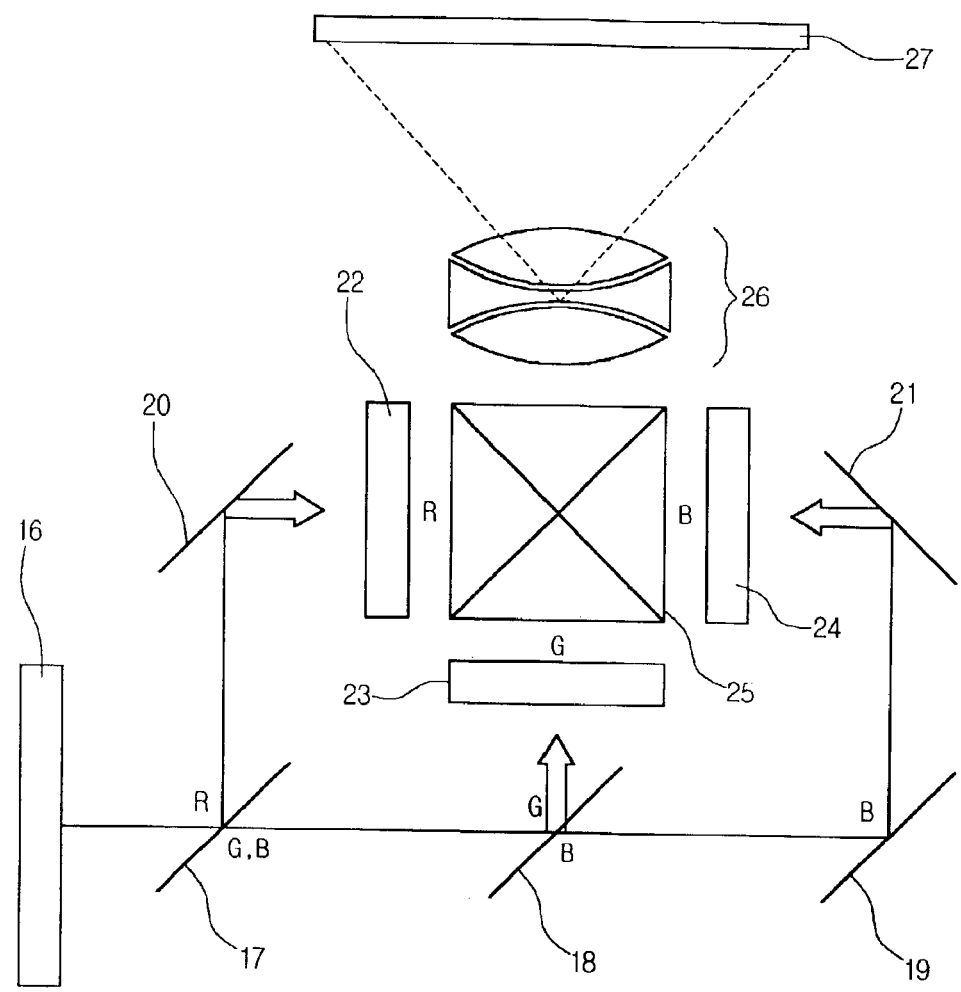
FIG. 2 is a view illustrating a projection system using a three-plate transmission type LCD for the conventional projector.
Figure 3:
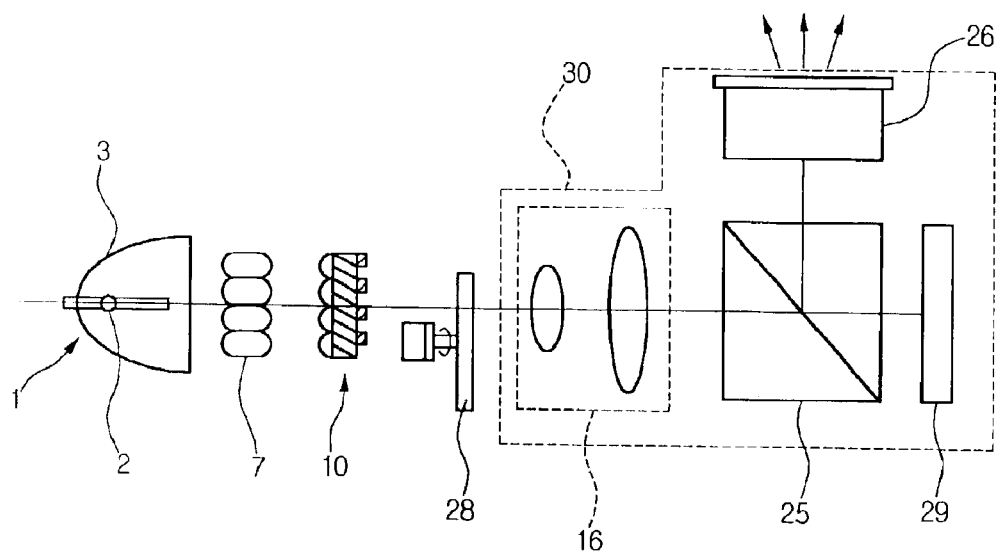
FIG. 3 is a schematic view illustrating a conventional single-plate type projector.
Figure 4:
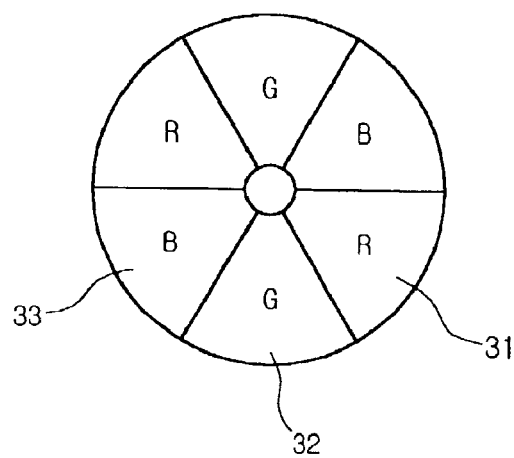
FIG. 4 is a view illustrating alignment of transmitting filters in a color wheel of FIG. 3.

The following detailed description will present an integrator, a polarization conversion device and a display apparatus using the same according to preferred embodiments of the invention in reference to the accompanying drawings.

In the following description, same drawing reference numerals are used for the same elements even in different drawings.

Figure 5:
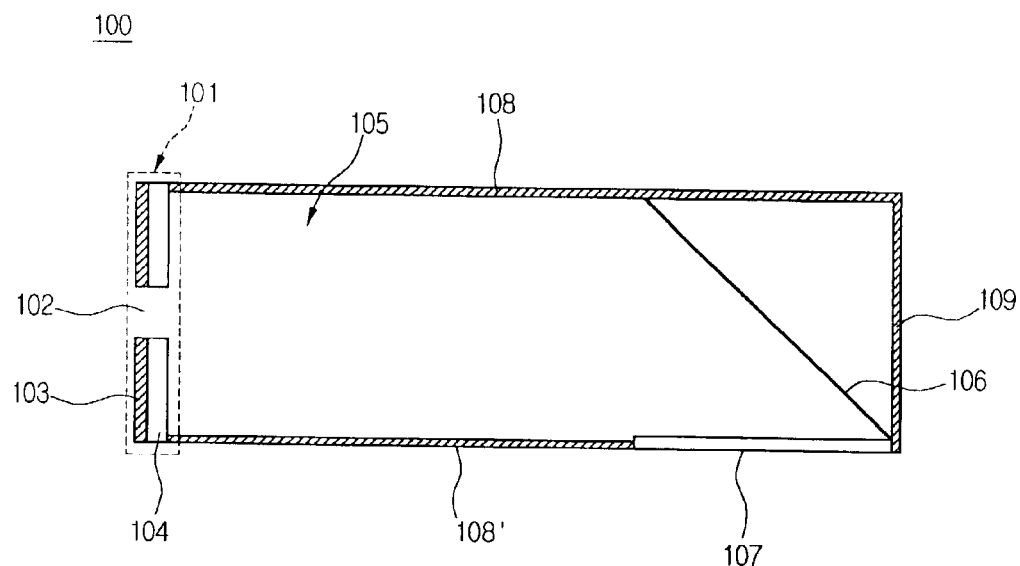
FIG. 5 is a schematic structure view illustrating an integrator engaged with a color drum in accordance with a first embodiment of the present invention.
Figure 6:
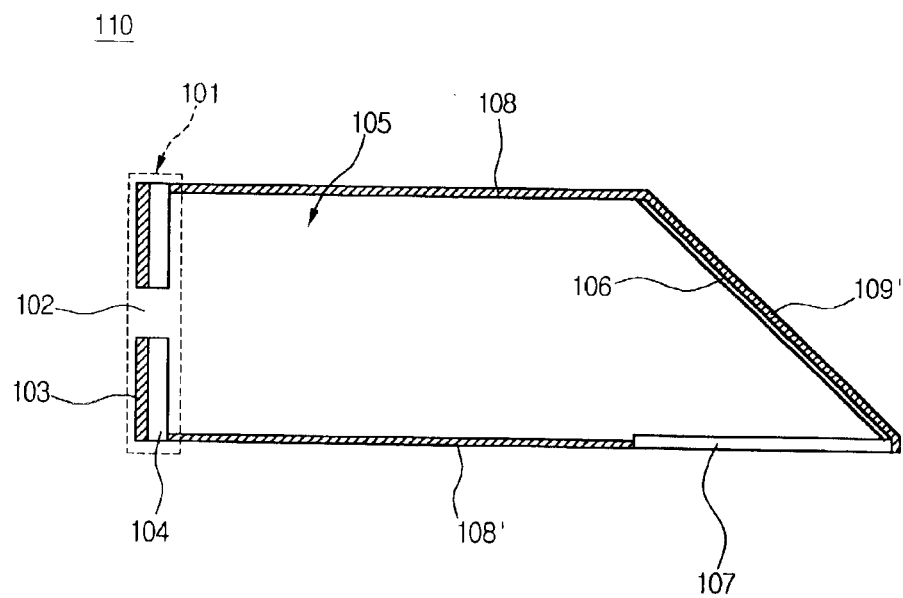
FIG. 6 is a schematic structure view illustrating another example of the integrator engaged with the color drum in accordance with the first embodiment of the present invention.

FIG. 5 is a schematic structure view illustrating an integrator engaged with a color drum in accordance with a first embodiment of the present invention, and FIG. 6 is a schematic structure view illustrating another example of the integrator engaged with the color drum in accordance with the first embodiment of the present invention.

Referring to FIGS. 5 and 6, each of the integrators 100 and 110 includes an incident unit 101 for passing externally-inputted lights and reflecting internally-inputted lights, a polarizing unit for externally outputting polarized lights among the lights inputted to the incident unit 101, and a recycling unit 105 for recycling the lights inputted to the incident unit 101 within a certain area until they are externally outputted.

In the incident unit 101, an opening 102 for internally transmitting the externally-inputted lights is formed, and a reflecting surface 103 and a phase modulation device 104 are sequentially laminated in the area where the opening 102 has not been formed.

Preferably, the reflecting surface 103 is a total reflecting mirror or a reflecting mirror, and the phase modulation device 104 formed on the rear surface of the reflecting surface 103 is a λ/4 plate. The λ/4 plate modulates a phase of the incident lights by λ/4. In addition, the lights phase-modulated by λ/4 are reflected by the reflecting surface 103, and re-inputted to the λ/4 plate. Thus, the phase of the lights is re-modulated by λ/4. As a result, the phase of the lights transmitted to the λ/4 plate is modulated by λ/2, namely 90°. That is, P-wave lights are outputted as S-wave lights, and vice versa.

The polarizing unit includes first and second polarizing plates 106 and 107. The first polarizing plate 106 is inclined in a predetermined space of the recycling unit 105 so that the lights transmitted through the opening 102 in parallel can be vertically reflected. That is, the first polarizing plate 106 is positioned on an optical path of the incident unit 101 and the second polarizing plate 107. The second polarizing plate 107 is positioned in a predetermined area of the recycling unit 105 so that the lights vertically reflected by the first polarizing plate 106 can be inputted thereto. Preferably, the first polarizing plate 106 is inclined to the second polarizing plate 107 at the inside angle of 45°. Therefore, when lights are externally inputted through the opening 102 in parallel, they are reflected by the first polarizing plate 106 by of 90° and inputted to the second polarizing plate 107. That is, the lights externally transmitted to the first polarizing plate 106 in parallel are all inputted to the second polarizing plate 107.

The first and second polarizing plates 106 and 107 are means for converting non-polarized lights inputted through the opening 102 into polarized lights. That is, the first polarizing plate 106 is a reflection type P/S splitting means for reflecting S-wave lights and transmitting P-wave lights, and the second polarizing plate 107 is a reflection type P/S splitting means for transmitting S-wave lights and reflecting P-wave lights. Here, a PBS or a reflection type polarizing plate can be used as the reflection type P/S splitting means.

On the other hand, as shown in FIG. 6, a reflecting surface 109' formed on the rear surface separately from the first polarizing plate 106 can directly contact the rear surface of the first polarizing plate 106.

The recycling unit 105 includes a common structure having rectangular sections extended in a longitudinal direction. Here, reflecting surfaces 108, 108', 109 and 109' are formed on the inside surfaces of the rectangular sections. However, the reflecting surface is not formed on the second polarizing plate 107 formed in a predetermined area of the recycling unit 105.

Preferably, the reflecting surface 108' of the recycling unit 105 is longer than the second polarizing plate 107. Therefore, the lights inputted through the opening 102 can be homogenized.

The lights inputted through the opening 102 are circulated within a predetermined space of the recycling unit 105 until they are outputted through the second polarizing plate 107. In this embodiment, a total reflecting mirror is adhered to the inside surfaces of the common structure having the rectangular sections (hollow type). However, the total reflecting mirror can be adhered to the inside surfaces of a common structure having circular or polygonal sections such as octagonal or dodecagonal sections (solid type). In addition, a mirrored glass rod can be used with total reflection effects.

The integrators 100 and 110 perform an optical homogenizing process for spatially homogenizing heterogeneous lights through the opening 102, a polarization conversion process for converting non-polarized lights from the opening 102 into polarized lights by recycling, and an optical recapturing process for recycling and re-outputting the lights returned to the integrators 100 and 110 through the second polarizing plate 107.

The optical homogenizing process will now be explained.

The lights inputted through the opening 102 are a plurality of light rays going on different optical paths. Since the optical paths of the light rays are very different, the lights cannot be homogenized by overlapping.

In general, precision increases in a space where the lights have the same path, but decreases in a space where the lights have different paths. In the integrator 100 or 110, the reflecting surfaces 108 and 108' for providing optical circulation recycling are relatively long, and the second polarizing plate 107 for externally outputting the lights is relatively small. Accordingly, the optical paths of the lights outputted through the second polarizing plate 107 are considerably restricted, and thus differences in optical paths of the lights decrease. The optical paths of the lights outputted through the second polarizing plate 107 overlap in a predetermined space of the recycling unit 105, so that the lights can be homogenized.

Figure 7:
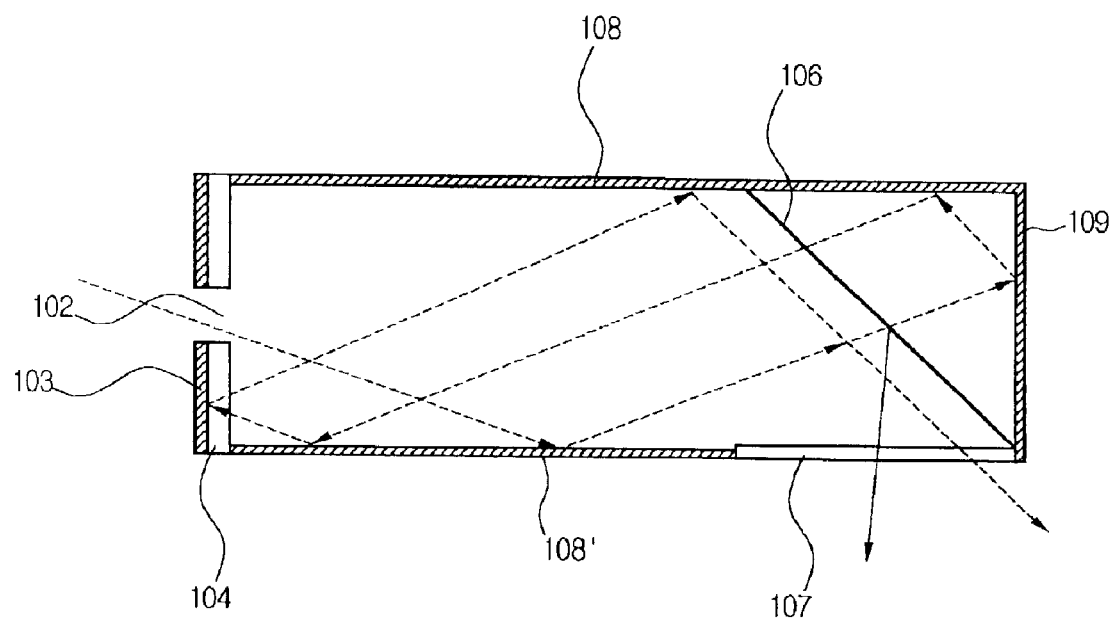
FIG. 7 is a view illustrating a polarization conversion process of the integrator of FIG. 5.

The polarization conversion process will now be explained with reference to FIG. 7. FIG. 7 is a view illustrating the polarization conversion process of the integrator of FIG. 5.

The lights inputted through the opening 102 are transmitted to the first polarizing plate 106 via the reflecting surfaces 108 and 108' or directly according to their incident angles, split into P-wave lights and S-wave lights through the first polarizing plate 106, and transmitted to different optical paths.

As discussed earlier, the first polarizing plate 106 transmits P-wave lights and reflects S-wave lights. Conversely, the second polarizing plate 107 reflects P-wave lights and transmits S-wave lights.

Here, the S polarized lights reflected by the first polarizing plate 106 are externally outputted through the second polarizing plate 107, but the P polarized lights transmitted through the first polarizing plate 106 are reflected by the reflecting surfaces 108 and 108' and re-inputted to the first polarizing plate 106. In addition, the lights passing through the first polarizing plate 106 are reflected by the reflecting surface, and inputted to the phase modulation device 104. Here, the phase of the lights is modulated by $\lambda/4$ by the phase modulation device 104, reflected by the reflecting surface 103, and re-inputted to the phase modulation device 104. The phase of the lights re-inputted to the phase modulation device 104 is re-modulated by $\lambda/4$. Accordingly, the phase of the P polarized lights firstly inputted to the phase modulation device 104 is modulated by $\lambda/2$. It implies that P polarized lights are converted into S polarized lights. The converted S polarized lights are reflected by the first polarizing plate 106, and externally outputted through the second polarizing plate 107.

As described above, the integrators 100 and 110 recycle the lights inputted to the opening 102, convert most of the incident lights into polarized lights, and externally output the polarized lights, to remarkably reduce optical loss during the polarization conversion process.

The optical recapturing process using a scroll device such as a color drum or color wheel will now be explained with reference to FIG. 8. In the optical recapturing process, the lights outputted through the second polarizing plate 107 of the integrator 100 or 110 are reflected by the scroll device, namely the color wheel or color drum, and returned to the integrator 100 or 110. The lights are recycled and re-transmitted to the scroll device through the second polarizing plate 107.

Figure 8:
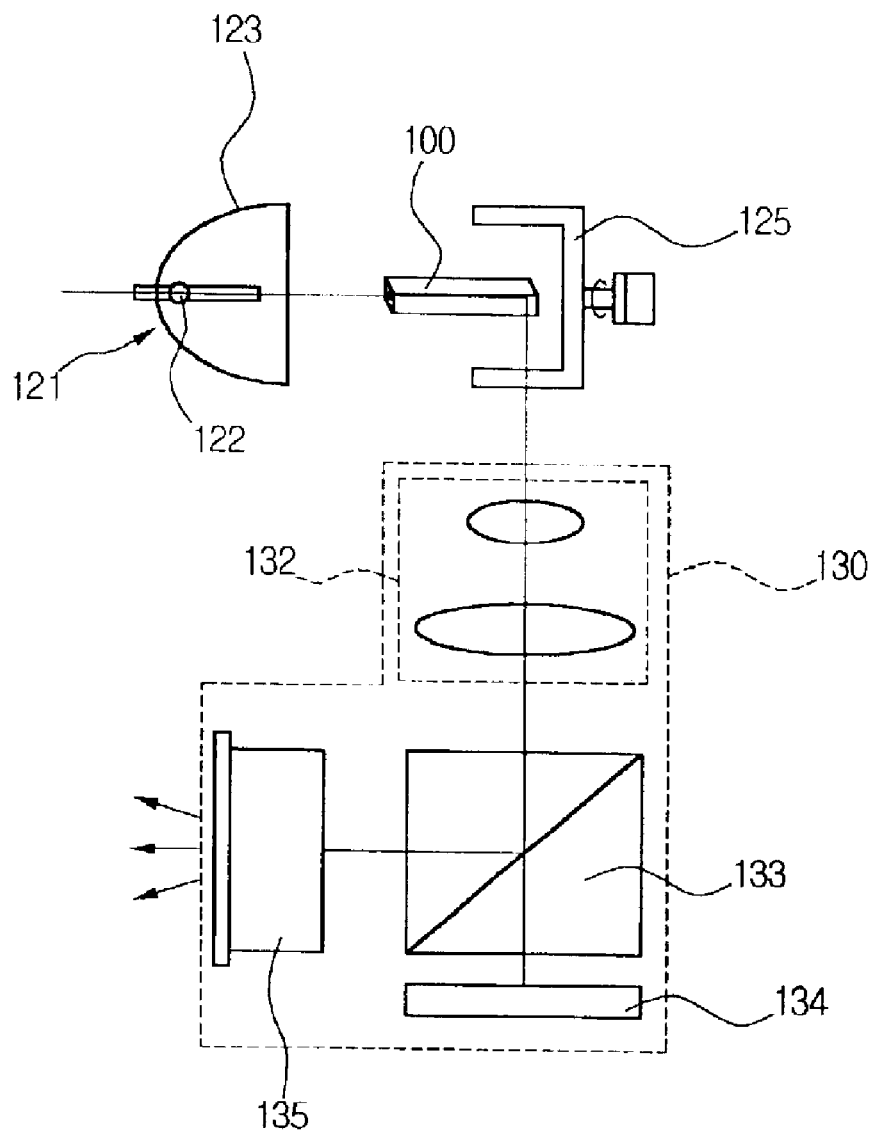
FIG. 8 is a schematic view illustrating a single-plate type projector having the integrator in accordance with the first embodiment of the present invention.

FIG. 8 is a schematic view illustrating a single-plate type projector having the integrator in accordance with the first embodiment of the present invention.

As shown in FIG. 8, the projector includes a lamp system 121 for generating heterogeneous lights, an integrator 100 for homogenizing the heterogeneous lights from the lamp system 121 by recycling, and polarizing and outputting the homogenized lights, a color drum 125 for splitting the polarized lights from the integrator 100 into R, G and B lights, and selectively transmitting the split color lights, and an optical modulation system 130 for modulating the lights selectively-transmitted from the color drum 125 according to an image signal to form color images. Here, the optical modulation system 130 includes a relay lens 132, a PBS 133, a display device (for example, LCD) 134 and a projecting lens 135.

The lamp system 121 includes a bulb 122 for generating heterogeneous lights, and a reflecting mirror 123 for transmitting the heterogeneous lights from the bulb 122 in parallel.

The integrator 100 was explained above, and thus detailed explanations thereof are omitted. The optical recapturing process by the integrator 100 will later be explained.

Figure 9:
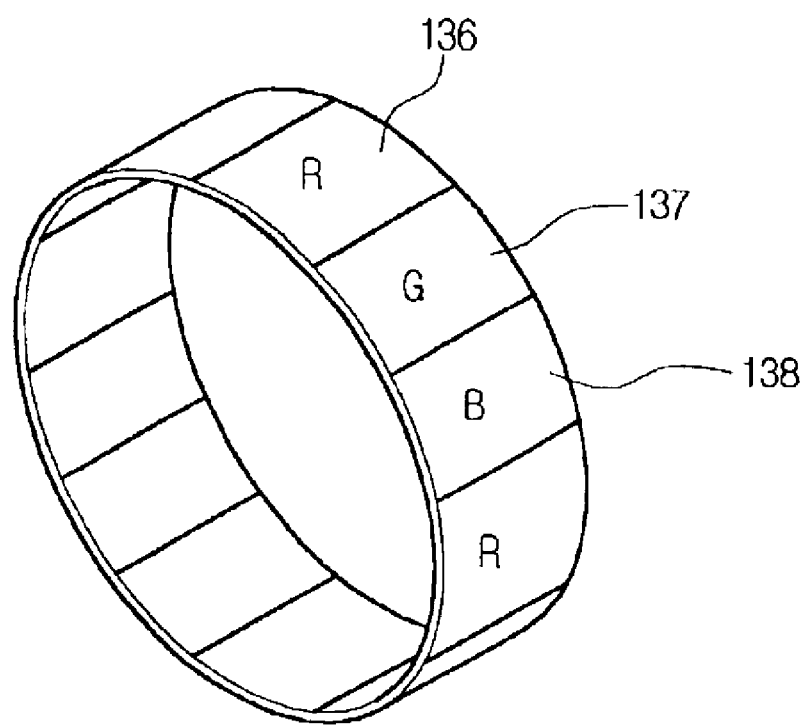
FIG. 9 is a view illustrating alignment of filter cells in a color drum of FIG. 8.

As depicted in FIG. 9, the color drum 125 has a cylindrical transmitting surface. The transmitting surface is dichroic-coated to selectively transmit the R, G and B lights. R, G and B filter cells 136, 137 and 138 for selectively transmitting corresponding lights among the incident lights are alternately aligned on the transmitting surface.

The operation of the single-plate type projector will now be explained with reference to FIGS. 8 to 11.

Figure 10:
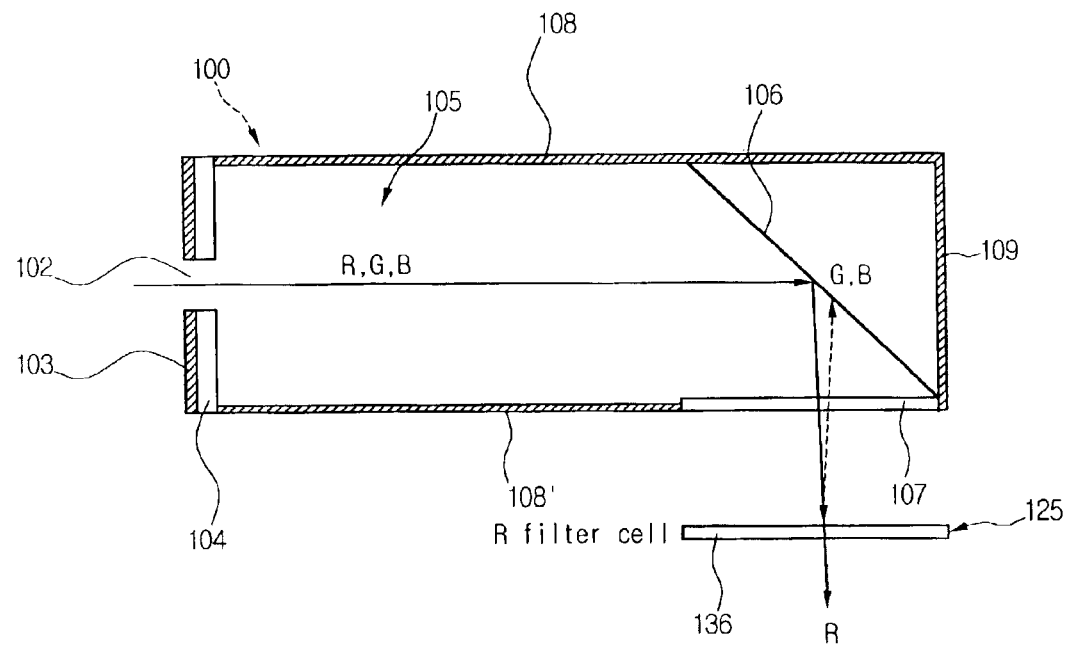
FIGS. 10 and 11 are views illustrating an optical recapturing process by the integrator of the single-plate type projector in accordance with the first embodiment of the present invention.
Figure 11:
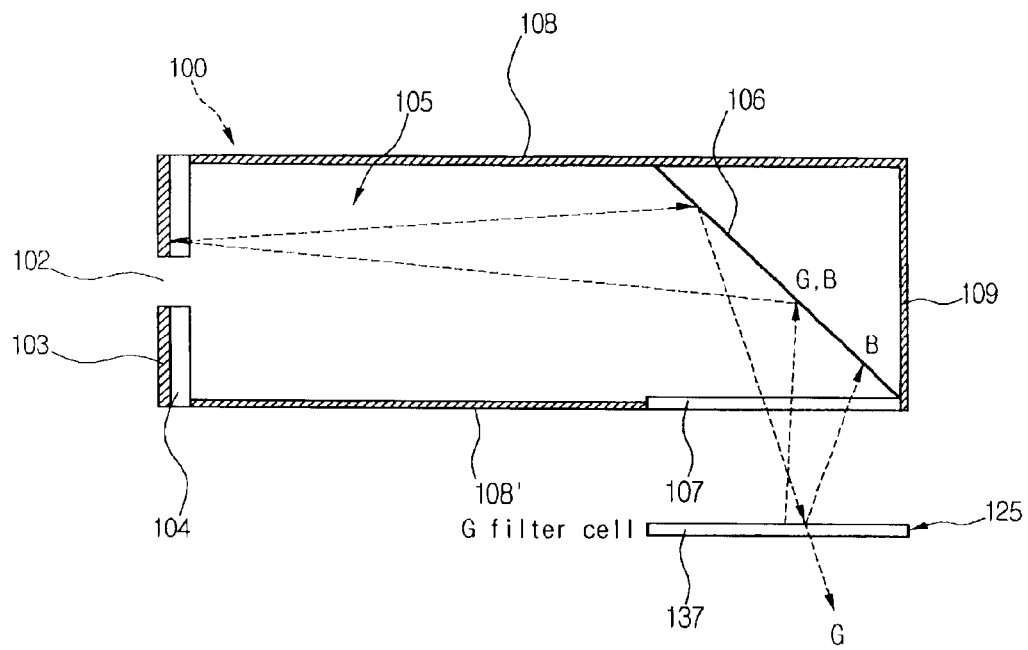

FIGS. 10 and 11 are views illustrating the optical recapturing process by the integrator of the single-plate type projector in accordance with the first embodiment of the present invention.

The heterogeneous lights generated in the lamp system 121 are homogenized and converted into polarized lights through the integrator 100, and inputted to the color drum 125. As illustrated in FIGS. 10 and 11, the lights from the lamp system 121 are inputted into the integrator 100 through the opening 102, and transmitted to the first polarizing plate 106. When the lights are S-wave lights, they are reflected and inputted to the color drum 125 via the second polarizing plate 107. When the lights are P-wave lights, they are directly inputted to the reflecting surfaces 108 and 108' of the recycling unit 105. Here, the P-wave lights are converted into S-wave lights by the phase modulation device 104 according to the recycling process of passing through the reflecting surfaces 108 and 108' formed on the rectangular sections, passed through the first polarizing plate 106 or reflecting surfaces 108 and 108', and inputted to the color drum 125 through the second polarizing plate 107.

As described above, the integrator 100 homogenizes the lights inputted to the lamp system 121, and outputs linearly-polarized lights according to the recycling process, which was explained above in detail.

On the other hand, the polarized lights inputted to the color drum 125 are selectively transmitted by the filter cells corresponding to R, G and B. The color drum 125 transmits the lights satisfying the transmission conditions of the corresponding filter among the inputted polarized lights, and returns the other lights to the integrator 100.

For example, as shown in FIG. 10, when the polarized lights outputted through the second polarizing plate 107 of the integrator 100 are inputted to the R filter cell 136 of the color drum 125, the R lights satisfying the transmission conditions are transmitted, but the other color lights, namely the G and B lights are reflected, recaptured, and returned to the integrator 100 through the second polarizing plate 107.

The G and B lights returned to the integrator 100 are recycled and re-inputted to the color drum 125 through the second polarizing plate 107. Here, as depicted in FIG. 11, when the filter cell of the color drum 125 is the G filter cell 137, the G lights are transmitted, but the B lights are reflected, returned to the integrator 100, and then recycled.

As a result, the integrator 100 recaptures the lights reflected by the color drum 125, and re-inputs them to the color drum 125 by recycling, to minimize optical loss during the color splitting and scrolling processes using the color drum 125.

The lights transmitted through the respective filter cells 136, 137 and 138 of the color drum 125 form color images by the optical modulation system 130.

The structure of an integrator engaged with a color wheel will now be described.

Figure 12:
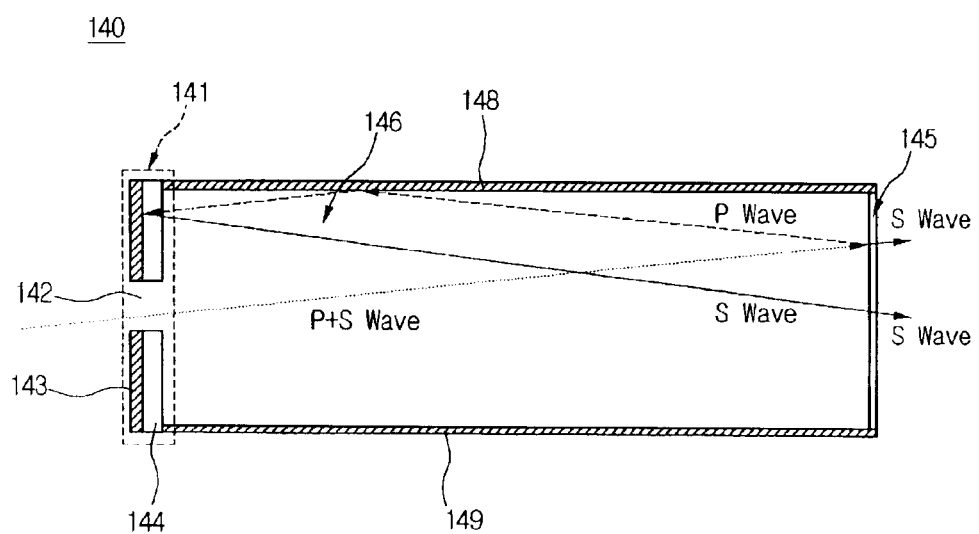
FIG. 12 is a schematic structure view illustrating an integrator engaged with a color wheel in accordance with a second embodiment of the present invention.

FIG. 12 is a schematic structure view illustrating an integrator engaged with a color wheel in accordance with a second embodiment of the present invention.

Referring to FIG. 12, the integrator 140 includes an incident unit 141 for passing externally-inputted lights, and reflecting internally-inputted lights, a polarizing unit 145 for externally outputting polarized lights among the lights inputted to the incident unit 141, and a recycling unit 146 for recycling the lights inputted to the incident unit 141 within a certain space until they are externally outputted.

The incident unit 141 was explained with reference to FIGS. 5 and 6, and thus detailed explanations thereof are omitted.

The polarizing unit 145 serve to convert non-polarized lights inputted through an opening 142 into polarized lights. Any kinds of means having P/S splitting function such as a PBS or reflection type polarizing plate can be used as the polarizing unit. The polarizing unit is positioned to face the incident unit 141 on the opposite side, for reflecting S-wave lights and transmitting P-wave lights.

Figure 13:
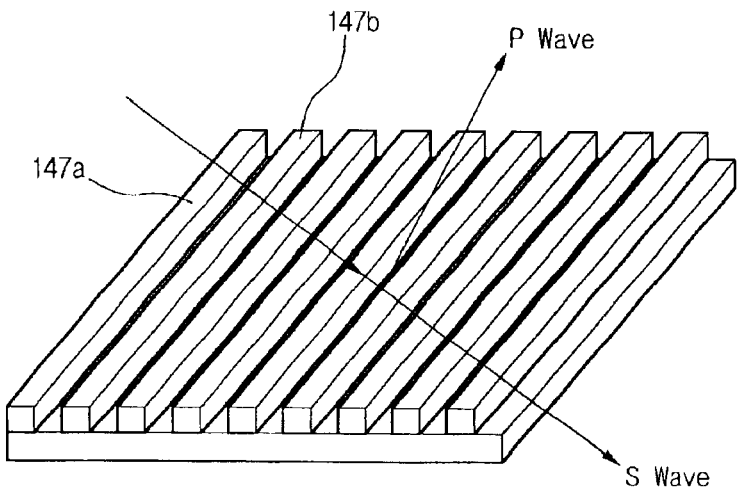
FIG. 13 is a structure view illustrating a polarizing unit of the integrator in accordance with the second embodiment of the present invention.

FIG. 13 is a structure view illustrating the polarizing unit of the integrator in accordance with the second embodiment of the present invention.

As illustrated in FIG. 13, in the polarizing unit 145, bar-shaped polarizers 147a and 147b are formed on the wide plate in one direction at predetermined intervals.

In the integrator 140 of the second embodiment, reflecting surfaces are not formed on the rear surface of the polarizing unit 145. Therefore, the lights polarized and outputted through the polarizing unit 145 are not reflected.

On the other hand, the recycling unit 146 is a common structure having rectangular sections extended in a longitudinal direction. It can include reflecting surfaces 148 and 149. The recycling unit 146 circulates the lights inputted through the opening 142 within a predetermined space until they are outputted through the polarizing unit 145.

In addition, the integrator 140 is formed in a hollow type, solid type or mirrored glass rod.

The integrator 140 performs an optical homogenizing process for spatially homogenizing heterogeneous lights through the opening 142, a polarization conversion process for converting non-polarized lights from the opening 142 into polarized lights by recycling, and an optical recapturing process for recycling and re-outputting the lights returned to the integrator 140 through the polarizing plate 145. Here, the optical recapturing process is performed by using the color wheel, and thus useful for the single or two-plate type projector using the color wheel.

A polarization conversion device having the integrator 140 will now be explained.

Figure 14:
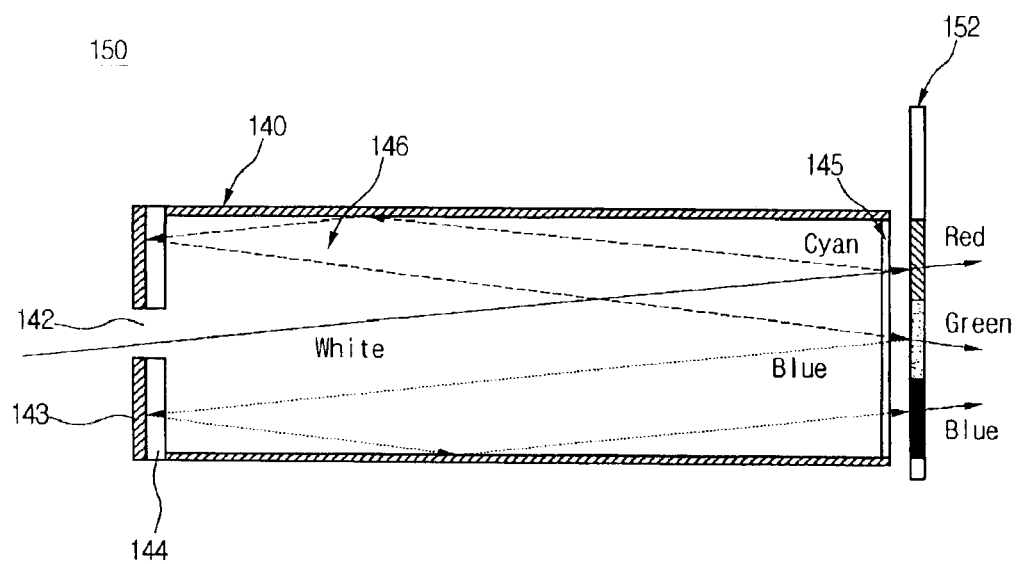
FIG. 14 is a schematic view illustrating a polarization conversion device having the integrator in accordance with the second embodiment of the present invention.

FIG. 14 is a schematic view illustrating the polarization conversion device having the integrator in accordance with the second embodiment of the present invention.

As shown in FIG. 14, the polarization conversion device 150 includes an integrator 140 for homogenizing externally-inputted heterogeneous lights by recycling, and polarizing and outputting the homogenized lights, and a color wheel 152 for splitting the polarized lights from the integrator 140 into R, G and B lights by rotation, and selectively transmitting the split color lights.

Figure 15:
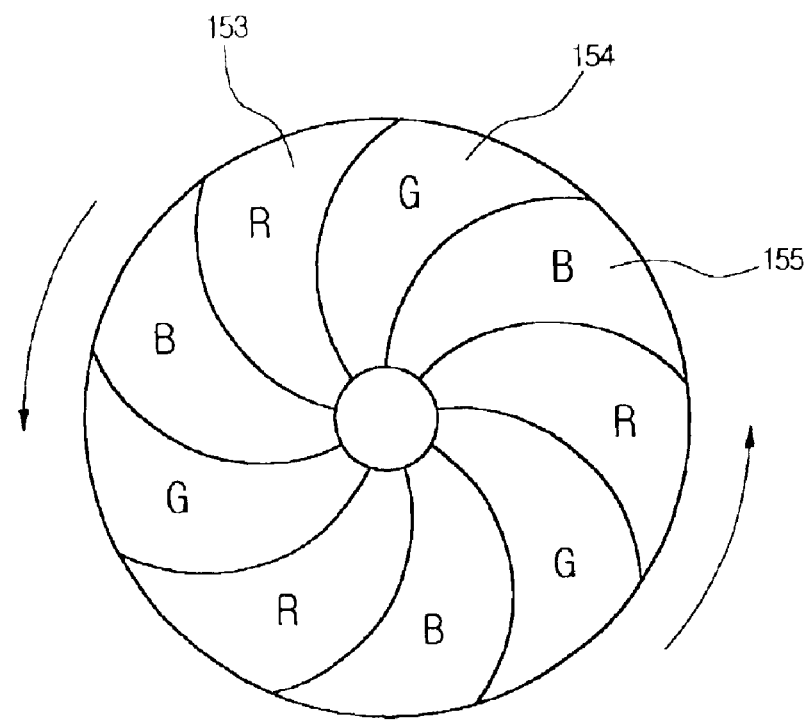
FIG. 15 is a view illustrating alignment of transmitting filters in the color wheel of the polarization conversion device of FIG. 14.

As depicted in FIG. 15, the color wheel 152 is formed in a disk shape where R, G and B transmitting filters 153, 154 and 155 are sequentially aligned. Each of the transmitting filters 153, 154 and 155 is preferably formed in a spiral shape. Accordingly, the color wheel 152 temporally selectively transmits the color lights among the polarized lights from the integrator 140 by rotation according to areas of the transmitting filters 153, 154 and 155.

The operation of the polarization conversion device 150 will now be explained. The externally-inputted heterogeneous lights are homogenized and polarized. Some lights (S-wave) are transmitted, and the other lights (P-wave) are reflected, circulated in the recycling unit 146 and converted into S-wave lights. The converted S-wave lights are transmitted.

The polarized lights outputted from the integrator 140 are inputted to the color wheel 152, and split into R, G and B lights. The color lights corresponding to the transmitting filters 153, 154 and 155 are transmitted by rotation of the color wheel 152, and the other lights are reflected.

The reflected lights are re-inputted to the integrator 140, and re-inputted to the color wheel 152 by recycling. Here, the color lights corresponding to the transmitting filters 153, 154 and 155 are transmitted. That is, the lights which are not transmitted by the color wheel 152 are re-inputted to the integrator 140 and transmitted through the color wheel 152 by recycling, to minimize optical loss and increase an amount of lights.

The P/S polarization conversion and color recapturing efficiency of the integrator 140 is theoretically calculated as follows.

There are presumed that the lights inputted to the integrator 140 are evenly distributed (in angle and position) and are not absorbed by any substances, an amount of the lights reflected by the polarizing unit 145 is 50%, an amount of the transmitted lights is 50%, and a ratio of S-wave to P-wave elements of the lights passing through the integrator 140 is 50 to 50%.

Under the presumptions, the P/S polarization conversion principle and the P/S polarization conversion amount by the integrator 140 are represented by following formulae.

When the amount of the lights inputted to the integrator 140 is Ei, an amount of the lights passing through the opening 142 (Eo) is represented by following formula 1:

$$Eo=(a/a')Ei \quad \text{[Formula 1]}$$

Here, a represents an area of the opening of the integrator, and a' represents a sectional area of the integrator.

In addition, the P/S conversion amount of the lights passing through the integrator 140 (Et) is represented by following formula 2:

$$Et=\{a/(a'+1)\}Ei \quad \text{[Formula 2]}$$

A total transmission amount of the lights transmitted through the color wheel 152 is represented by following formula 3:

$$Ep=\{aEi/[(a'+1)(2+R)]\}Ei \quad \text{[Formula 3]}$$

In formula 3, R represents capturing efficiency according to the structure of the color wheel.

If a general FEL & PBS array and the integrator of the second embodiment of the present invention are designed in a specific size of display device by using the above-calculated results, and the P/S conversion efficiency is simulated by using the integrator according to formulae 1 to 3, the following results can be obtained.

The general FEL & PBS array has 54.843% of efficiency, and the polarization conversion device of the second embodiment has 60.673% of efficiency. Accordingly, the polarization conversion device increases the amount of lights, and thus improves color purity.

Figure 16:
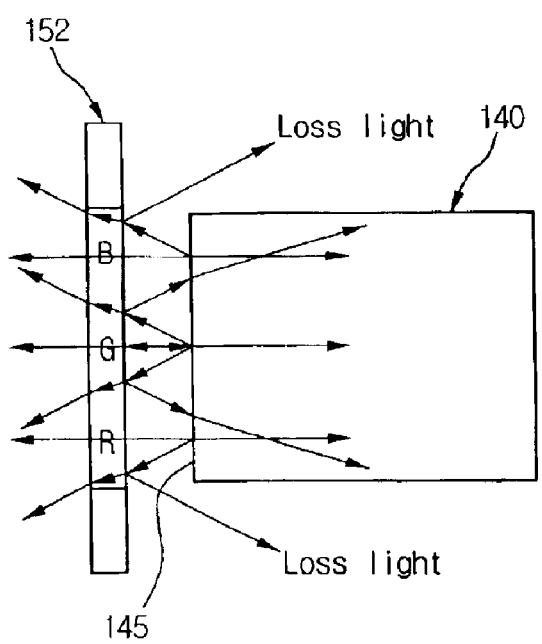
FIG. 16 is a view illustrating loss of lights reflected by the color wheel in the polarization conversion device of FIG. 14.

The polarization conversion device of the second embodiment can minimize loss of the lights reflected by the color wheel, but cannot prevent it. As shown in FIG. 16, the color wheel 152 composed of planes faces the polarizing unit 145 of the integrator 140. Therefore, when the lights outputted to the outside of the integrator 140 are reflected, the reflected lights are not re-inputted to the integrator 140 but externally lost. As a result, brightness of the lights decreases due to the loss of the lights outputted to the outside of the integrator 140.

Figure 17:
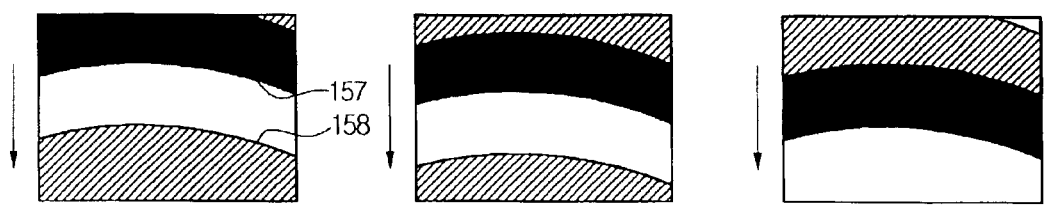
FIG. 17 is a view illustrating movement of color lights scrolled by the polarization conversion device of FIG. 14.

In addition, when the color wheel 152 where the R, G and B transmitting filters 153, 154 and 155 are formed in a spiral shape as shown in FIG. 15 is rotated, the R, G and B transmitting filters 153, 154 and 155 are sequentially moved to selectively transmit the corresponding color lights. When the R, G and B transmitting filters 153, 154 and 155 transmit the color lights to the display device, color lights having curved interfaces 157 and 158 are generated as shown in FIG. 17. It is thus difficult to manufacture the spiral color wheel 152. Moreover, the scroll shape by the color wheel is not a straight line but a curved line, which reduces optical efficiency.

A polarization conversion device which can solve the foregoing problems will now be explained.

Figure 18:
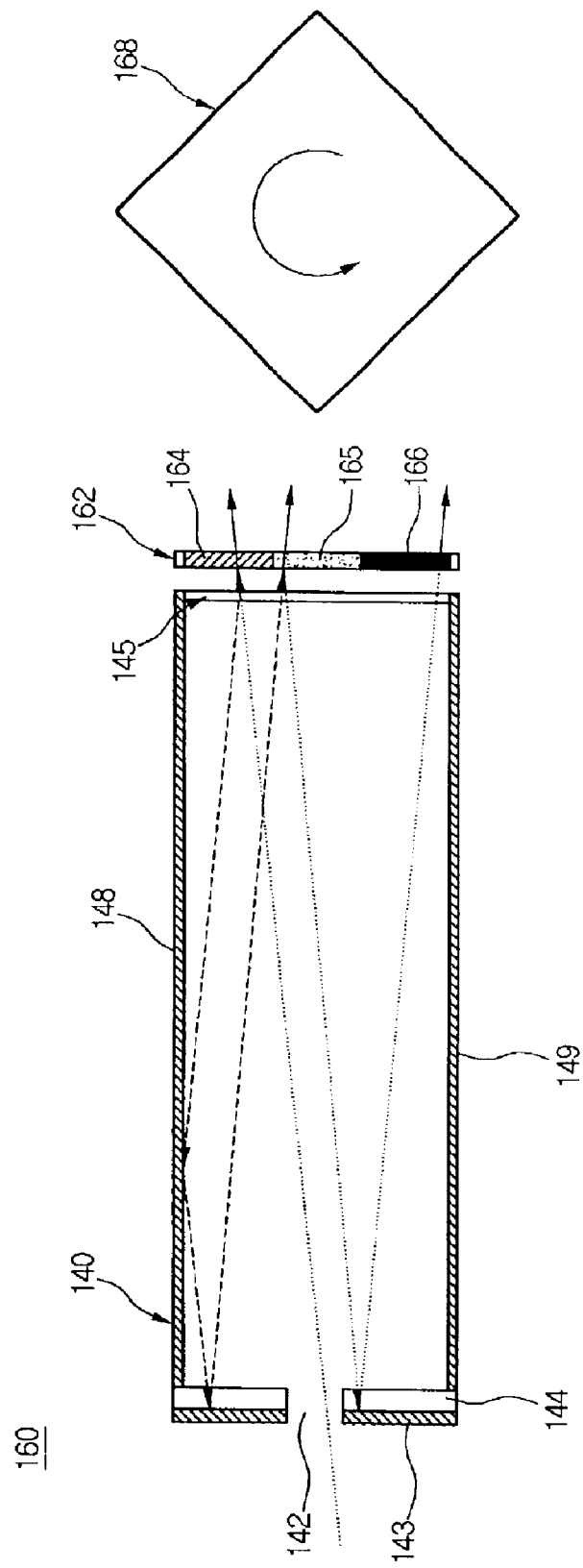
FIG. 18 is a schematic view illustrating a polarization conversion device in accordance with a third embodiment of the present invention.

FIG. 18 is a schematic view illustrating a polarization conversion device in accordance with a third embodiment of the present invention.

Referring to FIG. 18, the polarization conversion device 160 includes an integrator 140 for homogenizing externally-inputted heterogeneous lights by recycling, and polarizing and outputting the homogenized lights, a color bar filter 162 incorporated with the integrator 140, for splitting the polarized lights from the integrator 140 into R, G and B lights, and selectively transmitting the split lights, and a rotating prism 168 rotated for changing an alignment order of the color lights outputted from the color bar filter 162. Here, the integrator 140 includes an incident unit 141, a polarizing unit 145 and a recycling unit 146, identically to the integrator of FIG. 14.

The color bar filter 162 is fixedly adhered to the polarizing unit 145 of the integrator 140, and includes R, G and B transmitting filters 164, 165 and 166. Preferably, the R, G and B transmitting filters 164, 165 and 166 adhered to the polarizing unit 145 are aligned in a different size rectangular shape. An amount of R lights is generally the smallest among the lights outputted from a lamp system. Accordingly, the R transmitting filter 164 can be formed larger than the G and B transmitting filters 165 and 166.

Figure 19:
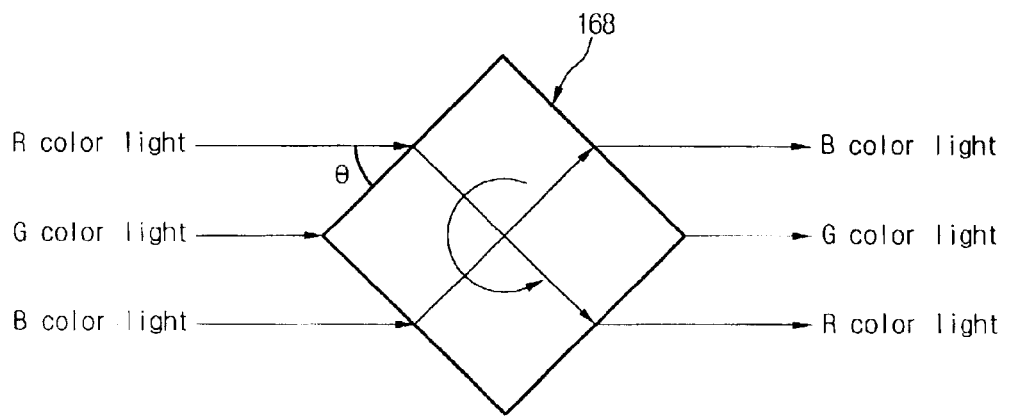
FIG. 19 is a view illustrating variations of paths of each color light by a rotating prism in the polarization conversion device of FIG. 18.

The rotating prism 168 is preferably rotated on the central axis vertically crossing the color lights outputted from the color bar filter 162. When the rotating prism 168 is rotated, the color lights from the color bar filter 162 are outputted by the rotating prism 168 as shown in FIG. 19. The color lights inputted to the rotating prism 168 are refracted and outputted according to an incident angle ($\theta$). Here, the color lights vertically inputted to the surface of the rotating prism 168 are outputted without being refracted.

The operation of the polarization conversion device 160 will now be explained. The externally-inputted lights are split into P/S polarized lights by the polarizing unit 145 through the opening 142 of the integrator 140. Here, S polarized lights are transmitted and P polarized lights are reflected. The reflected P polarized lights are reflected by reflecting surfaces 148 and 149 of the integrator 140. Otherwise, the reflected P polarized lights are passed through the phase modulation device 144, reflected by a reflecting surface 143, and re-passed through the phase modulation device 144. Thus, a phase of the P polarized lights is modulated by 90°, and thus the P polarized lights are converted into S polarized lights. The converted S polarized lights can be transmitted through the polarizing unit 145.

On the other hand, the S polarized lights transmitted through the polarizing unit 145 of the integrator 140 are inputted to the color bar filter 162. Here, the S polarized lights are split into R, G and B lights by the R, G and B transmitting filters 164, 165 and 166 of the color bar filter 162. That is, the R lights of the S polarized lights inputted to the R transmitting filter 164 are transmitted, but the G and B lights are reflected. The G and B lights reflected by the R transmitting filter 164 are re-inputted to the integrator 140, and re-transmitted through the polarizing unit 145 by recycling. The transmitted G and B lights are transmitted through the corresponding transmitting filters 165 and 166.

A color bar alignment order of the color lights transmitted through the color bar filter 162 is changed by rotation of the rotating prism 168.

For example, when the color bars displayed on the display device are aligned in the order of R, G and B lights, they are changed to be aligned in the order of G, B and R lights by rotation of the rotating prism 168. The color bars also can be aligned in the order of B, R and G lights.

That is, the color lights outputted to fixed positions by the color bar filter 162 adhered to the polarizing unit 145 of the integrator 140 are color-scrolled by rotation of the rotating prism 168, and thus the color bar alignment order of the color lights displayed on the display device is changed.

Accordingly, loss of the lights reflected by the color wheel as shown in FIG. 16 is prevented by adhering the color bar filter 162 to the polarizing unit 145 of the integrator 140, which results in remarkably improved optical efficiency.

In addition, the transmitting filters 164, 165 and 166 aligned in the color bar filter 162 are formed in a rectangular shape, and thus the color bars aligned on the display device by scrolling of the rotating prism 168 are not curved lines but straight lines. It can prevent optical efficiency from being reduced due to the color wheel having the spiral transmitting filters.

On the other hand, the polarization conversion device 160 can be applied to a projector having a DLP which does not use polarization as well as a reflection type LCD or transmission type LCD which uses polarization, by slightly changing the structure of the integrator 140.

The integrator 140 of FIG. 18 can be applied directly to the projector having the reflection type LCD or transmission type LCD. However, the projector having the DLP uses the integrator 140 which does not have the phase modulation device 144 and the polarizing unit 145.

In the polarization conversion device 160 of FIG. 18, an integrator for performing polarization conversion and color recapturing can be easily formed by replacing the color bar filter by the color switch.

Figure 20:
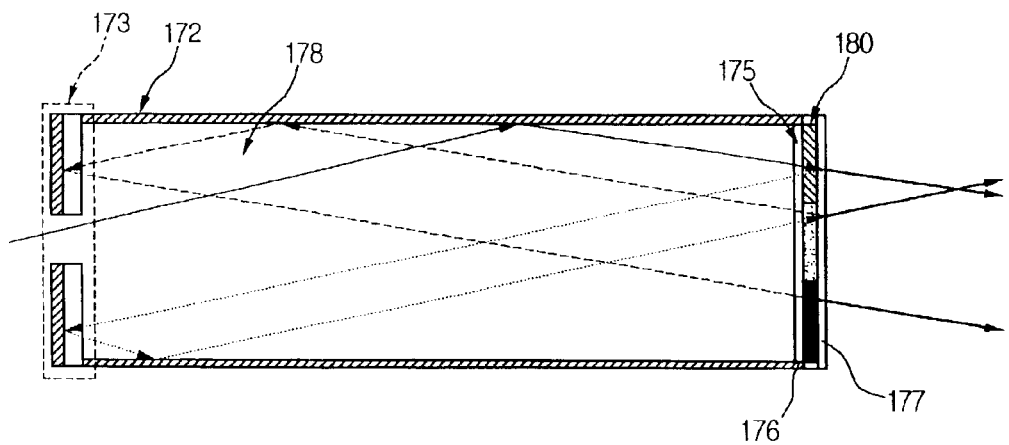
FIG. 20 is a schematic view illustrating a polarization conversion device in accordance with a fourth embodiment of the present invention.

FIG. 20 is a schematic view illustrating a polarization conversion device in accordance with a fourth embodiment of the present invention.

As illustrated in FIG. 20, the polarization conversion device 170 includes an integrator 172 for homogenizing externally-inputted heterogeneous lights by recycling, and polarizing and outputting the homogenized lights, and a color switch 180 incorporated with the integrator 172, for splitting the polarized lights from the integrator 172 into R, G and B lights, and selectively scrolling and transmitting the split lights.

The integrator 172 has an incident unit 173 for passing externally-inputted lights and reflecting internally-inputted lights, a polarizing unit 175 for externally outputting polarized lights among the lights inputted to the incident unit 173, and a recycling unit 178 for recycling the lights inputted to the incident unit 173 within a certain area until they are externally outputted.

Here, the polarizing unit 175 includes first and second polarizing plates 176 and 177 adhered to both sides of the color switch 180. The first polarizing plate 176 transmits S polarized lights and reflects P polarized lights, and the second polarizing plate 177 reflects S polarized lights and transmits P polarized lights. Due to the polarization property of the first and second polarizing plates 176 and 177, the P polarized lights inputted to the first polarizing plate 176 are converted into S polarized lights by recycling. The corresponding color lights of the S polarized lights passing through the first polarizing plate 176 are phase-modulated into P-wave lights by the color switch, and the converted P-wave lights are transmitted. The other non-transmitted lights become S-wave lights without phase modulation. The S-wave lights are reflected by the second polarizing plate 177, and transmitted through the integrator 173 by recycling. As a result, optical loss can be remarkably reduced by color recapturing.

Figure 21:
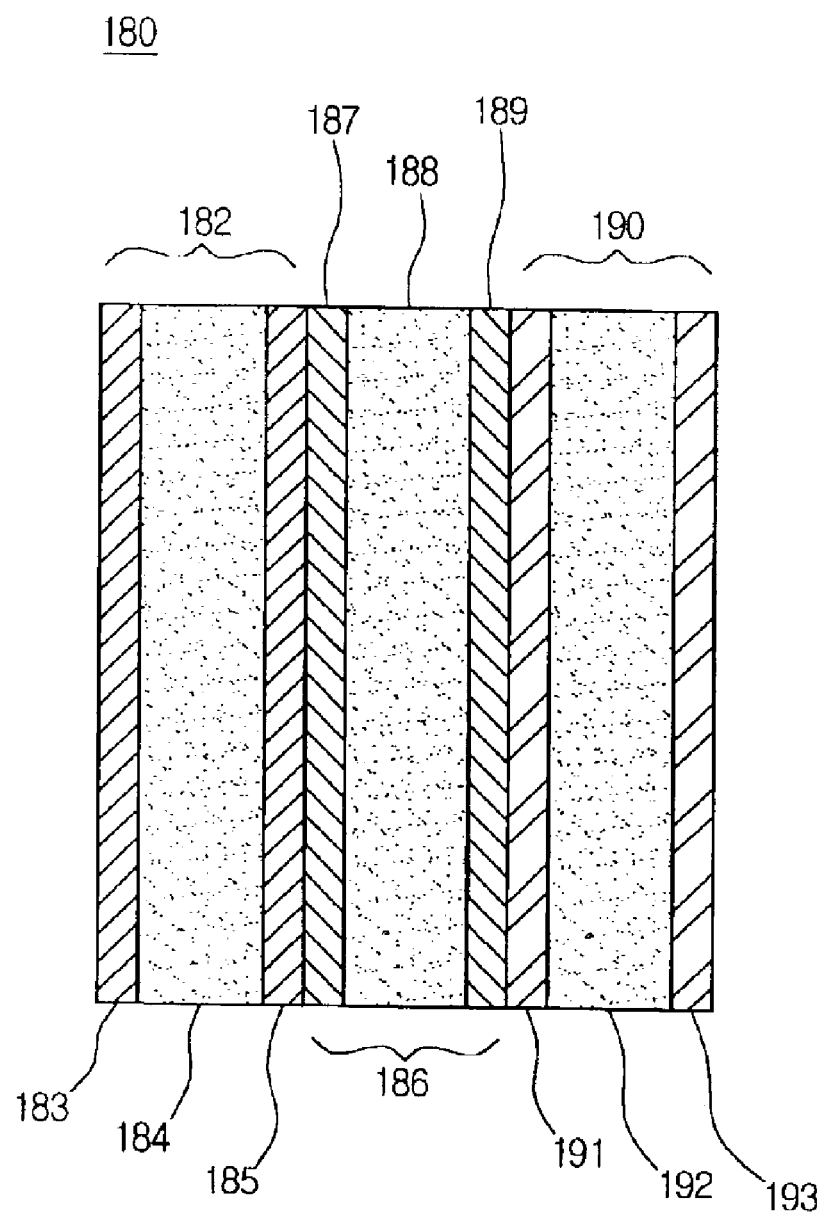
FIG. 21 is a schematic view illustrating a color switch of the polarization conversion device of FIG. 20.

As shown in FIG. 21, the color switch 180 includes an R cell 182 for modulating a phase of R lights, a G cell 186 for modulating a phase of G lights, and a B cell 190 for modulating a phase of B lights, which are bonded to each other.

Here, the cells 182, 186 and 190 include first wave plates 183, 187 and 191 and second wave plates 185, 189 and 193 for modulating the phase of the corresponding lights by 45°, and liquid crystal cells 184, 188 and 192 positioned between the first and second wave plates for oppositely modulating the phase of the color lights by 90° according to an electric signal.

Figure 22:
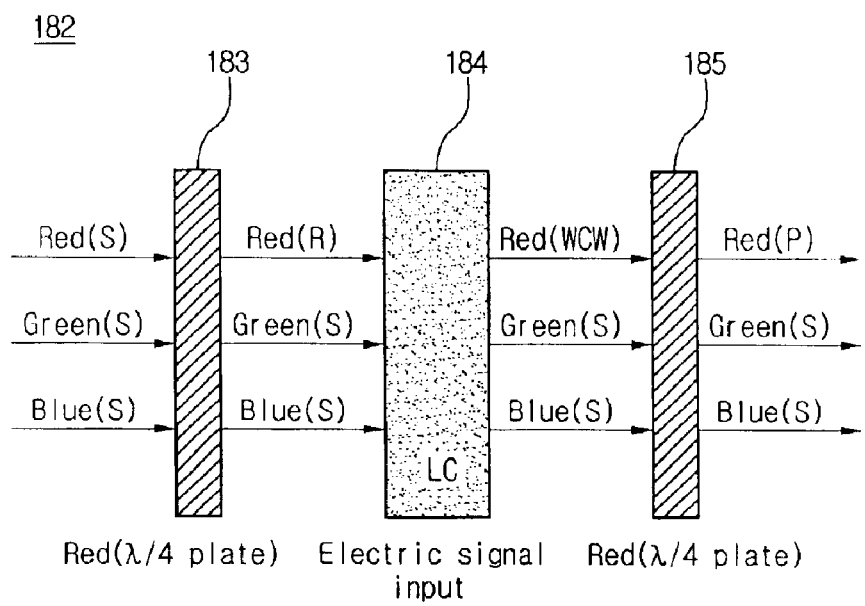
FIG. 22 is a view illustrating polarization conversions of each color light in the polarization conversion device of FIG. 20.

In more detail, as depicted in FIG. 22, the R cell 182 includes the first and second R wave plates 183 and 185 for modulating the phase of the R lights by 45°, and the R liquid crystal cell 184 positioned between the first and second R wave plates 183 and 185 for oppositely modulating the phase of the R lights by 90° according to the electric signal. That is, when the electric signal is enabled, the phase of the R lights is modulated by 90°, and when the electric signal is disabled, the phase of the R lights is not changed.

When the R, G and B lights are inputted to the R cell 182, the S-wave R lights are phase-modulated by 90° and outputted as P-wave R lights, but the S-wave G and B lights are outputted without phase modulation.

It will now be explained in more detail with reference to FIG. 23.

FIG. 23 is a view illustrating a phase modulation process of the R cell in accordance with the fourth embodiment of the present invention.

Figure 23A:
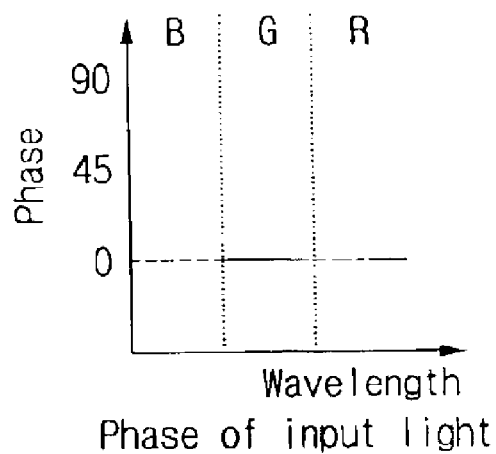
FIG. 23 is a view illustrating a phase modulation process of an R cell in accordance with the fourth embodiment of the present invention.
Figure 23B:
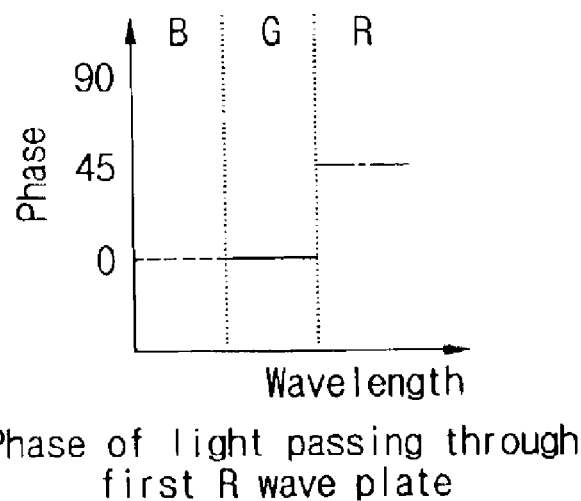
Figure 23C:
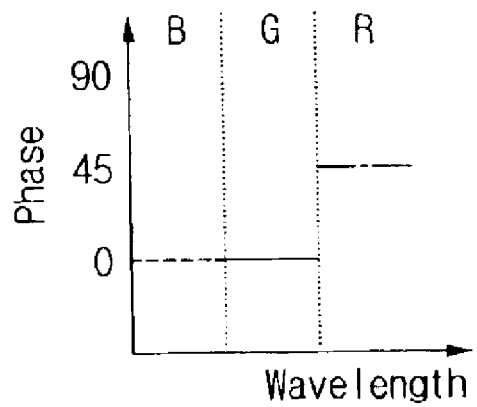

Referring to FIGS. 21 and 23, when the R, G and B lights having a phase of 0° are inputted to the R cell 182 (FIG. 23A), the phase of the R lights is modulated by 45° by the first R wave plate 183 (FIG. 23B). The phase of the R lights modulated by the first R wave plate 183 and the phase of the G and B lights which is not modulated are modulated by 90° through the R liquid crystal cell 184 in the opposite direction to the first wave plate 183, or not modulated. For example, when the externally-inputted electric signal is enabled, the phase of the R lights phase-modulated by 45° is modulated by −90°, and thus becomes −45° (FIG. 23E). Here, the phase of the G and B lights is not modulated in the R liquid crystal cell 184. Conversely, when the electric signal is disabled, the phase of the R lights phase-modulated by 45° is not changed (FIG. 23C).

Figure 23D:
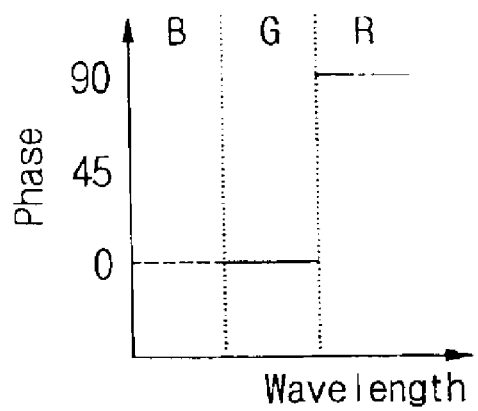
Figure 23E:
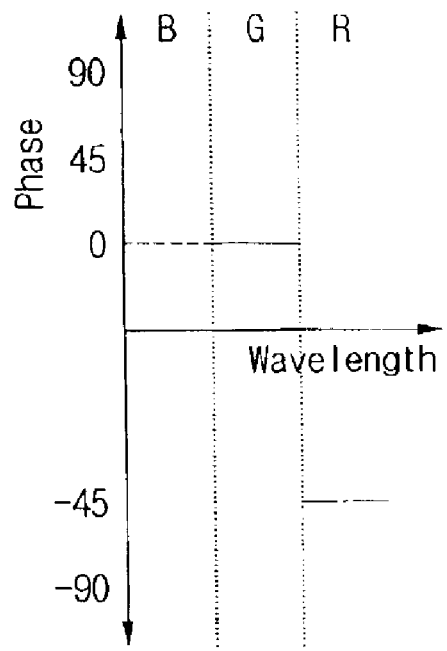
Figure 23F:
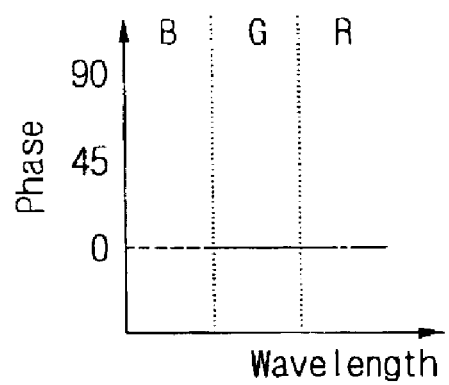

At this time, the phase of the R lights phase-modulated by −45° by the R liquid crystal cell 184 is modulated by 45° by the second R wave plate 185, and thus becomes 0° (FIG. 23F). The phase of the R lights which is not phase-modulated by the R liquid crystal cell 184 is modulated by 45° by the second R wave plate 185, and thus finally modulated by 90°.

The phase of the other color lights, namely the G and B lights is not modulated in the R liquid crystal cell 184 and the second R wave plate 185.

As shown in FIGS. 23D and 23F, the phase of the R lights inputted to the R cell 182 is modulated by 90° or not at all modulated according to the electric signal inputted to the R liquid crystal cell 184. Here, the phase of the G and B lights is not modulated through the first and second R wave plates 183 and 185 and the R liquid crystal cell 184.

The G cell 186 and the B cell 190 can perform the phase modulation process in the same manner as the R cell 182.

Therefore, basically, the R cell 182 can output the R lights, the G cell 186 can output the G lights, and the B cell 190 can output the B lights. In this case, the color lights may not be transmitted through the corresponding cells. For example, the R lights are transmitted or not transmitted through the R cell 182 according to the on/off state of the electric signal inputted to the R liquid crystal cell 184.

The operation of the polarization conversion device 170 will now be described. The externally-inputted heterogeneous lights are homogenized and polarized by the integrator 172. The corresponding polarized lights are outputted.

The polarized lights transmitted through the integrator 172 are split into color lights by the color switch 180, and the split color lights are scrolled and transmitted. Here, as shown in FIG. 24, the color lights transmitted through the color switch 180 are transmitted through or reflected by the second polarizing plate 177. That is, when the color lights from the color switch 180 are S-wave lights, the second polarizing plate 177 reflects them, and when the color lights from the color switch 180 are P-wave lights, the second polarizing plate 177 transmits them. The color lights transmitted through the second polarizing plate 177 are displayed as R, G and B color bars on the display device.

Figure 25:
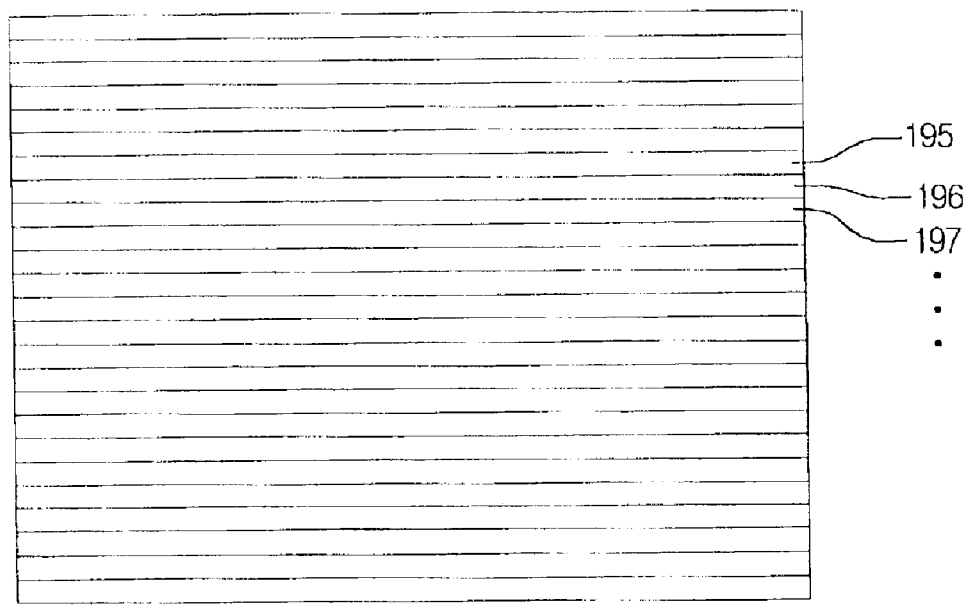
FIG. 25 is a view illustrating alignment of data electrodes of a liquid crystal cell of the color switch in the polarization conversion device of FIG. 20.

In order to display the R, G and B color bars on the display device, as shown in FIG. 25, data electrodes 195, 196 and 197 for applying color data are sequentially aligned in the liquid crystal cells 183, 186 and 190 of the color switch 180. Therefore, the color lights can be transmitted to corresponding positions through the color switch 180 by turning on/off the electrodes 195, 196 and 197.

Here, the positions of the color bars are changed by temporally turning on/off the data electrodes, as depicted in FIG. 26.

As described above, the straight line color bars can be displayed by color scrolling and the positions thereof can be changed, by controlling the liquid crystal cells 184, 188 and 192.

As discussed earlier, the polarization conversion device and the display apparatus using the same have following advantages:

Firstly, the integrator homogenizes the lights, and performs polarization conversion and color recapturing, thereby minimizing optical loss generated by using the general color wheel.

Secondly, the straight line color bars are displayed on the display device by color scrolling, by replacing the color wheel by the color bar filter and the color switch, which reduces optical loss.

Third, the structure of the integrator is changed to perform color recapturing in the display device having the DLP which does not use polarization as well as the transmission type LCD and reflection type LCD which use polarization, and thus application capability thereof is considerably improved.

Fourth, the amount of lights in the optical system increases because of color recapturing, and color purity is improved by using the increased amount of lights.

Fifth, the structure of the polarization conversion device is simplified and the number of the optical components is reduced, to miniaturize the optical system and cut down the production cost.

As a result, the projector using the polarization conversion device homogenizes the lights from the lamp system by recycling, inputs the polarized lights to the color drum, and recaptures and recycles the lights reflected by the color drum, to minimize optical loss generated in the color drum. Accordingly, optical efficiency is improved to create high luminance images.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An integrator, comprising:
a recycling unit having longitudinal sides and an end section, wherein the end section and at least a portion of the longitudinal sides are adapted to reflect incident input light;
an incident unit positioned on an input end of the recycling unit, wherein the incident unit comprises:
a reflective inner surface,
a phase modulator positioned on the reflective inner surface, and
an aperture formed through the reflective inner surface and phase modulator for transmitting input light into the recycling unit;
a first polarizing plate positioned in the recycling unit so as to transmit a first polarization state and reflect a second polarization state towards a longitudinal side of the recycling unit; and
a second polarizing plate positioned on a longitudinal side of the recycling unit and positioned to receive the second polarization state reflected by the first polarizing plate, wherein the second polarization plate is adapted to reflect the first polarization state and transmit the second polarization state out of the recycling unit.

2. The integrator according to claim 1, wherein the reflective inner surface of the incident unit comprises a mirror.

3. The integrator according to claim 1, wherein the first polarizing plate is tilted at an angle of 45° with respect to the second polarizing plate.

4. The integrator according to claim 1, wherein the recycling unit comprises a hollow member or a solid member.

5. The integrator according to claim 4, wherein the recycling unit comprises a mirrored glass rod.

6. The integrator of claim 1, wherein the end section of the recycling unit is tilted at a 45° degree angle with respect to the longitudinal sides.

7. The integrator of claim 6, wherein the first polarizing plate is attached to the end section of the recycling unit.

8. The integrator of claim 1, wherein the phase modulator modulates a phase of light by $\lambda/4$ in one pass through the phase modulator.

* * * * *